(12) United States Patent
Schmidt et al.

(10) Patent No.: US 11,370,063 B2
(45) Date of Patent: Jun. 28, 2022

(54) ENCODING AND IDENTIFYING A PLATE-LIKE WORKPIECE

(71) Applicant: TRUMPF Werkzeugmaschinen GmbH + Co. KG, Ditzingen (DE)

(72) Inventors: Berthold Schmidt, Princeton Junction, NJ (US); Klaus Bauer, Ditzingen (DE); Eberhard Wahl, Weilheim (DE); Andreas Popp, Markgroeningen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 259 days.

(21) Appl. No.: 16/537,661

(22) Filed: Aug. 12, 2019

(65) Prior Publication Data
US 2019/0358743 A1     Nov. 28, 2019

Related U.S. Application Data

(63) Continuation of application No. PCT/EP2018/053867, filed on Feb. 16, 2018.

(30) Foreign Application Priority Data

Feb. 17, 2017    (DE) .......................... 102017202628.6

(51) Int. Cl.
    *B23K 26/08*          (2014.01)
    *B23K 26/144*      (2014.01)
                    (Continued)

(52) U.S. Cl.
CPC ............ *B23K 26/08* (2013.01); *B23K 26/144* (2015.10); *B23K 26/146* (2015.10); *B23K 26/352* (2015.10); *B23K 2101/18* (2018.08)

(58) Field of Classification Search
CPC .... B23K 20/08; B23K 26/144; B23K 26/352; B23K 26/146; B23K 2101/18
(Continued)

(56) References Cited

U.S. PATENT DOCUMENTS

| 4,395,628 A | 7/1983 | Silverman et al. |
| 4,467,172 A * | 8/1984 | Ehrenwald ................ B44B 7/00 219/121.68 |

(Continued)

FOREIGN PATENT DOCUMENTS

| AU | 2009270482 | 1/2010 |
| CN | 106313912 A * | 7/2015 |

(Continued)

OTHER PUBLICATIONS

DE Office Action in German Appln. No. 102017202628.6, dated Jul. 5, 2018, 11 pages (with English machine translation).

(Continued)

*Primary Examiner* — Thien S Tran
(74) *Attorney, Agent, or Firm* — Fish & Richardson P.C.

(57) ABSTRACT

A method for encoding a plate-like workpiece comprising: defining an encoding area; applying a magnetic layer to the surface of the workpiece; fusing parts of the magnetic layer to the surface of the workpiece by acting on the workpiece with radiation within the encoding area; cooling the workpiece; removing the non-fused parts of the magnetic layer. The method permits the workpieces to be trackable in a simple manner, irrespective of surface treatments that may possibly be carried out or are to be carried out later.

19 Claims, 2 Drawing Sheets

(51) Int. Cl.
*B23K 26/146* (2014.01)
*B23K 26/352* (2014.01)
*B23K 101/18* (2006.01)

(58) Field of Classification Search
USPC .............. 219/76.14, 121.68, 121.69, 121.83
See application file for complete search history.

(56) References Cited

U.S. PATENT DOCUMENTS

| | | | |
|---|---|---|---|
| 4,837,426 A | 6/1989 | Pease et al. | |
| 4,936,608 A | 6/1990 | Gensel et al. | |
| 5,821,000 A | 10/1998 | Inui et al. | |
| 6,087,612 A | 7/2000 | Robitschko et al. | |
| 6,527,193 B1 | 3/2003 | Beli et al. | |
| 6,799,671 B1 | 10/2004 | Gomez | |
| 8,360,312 B2 | 1/2013 | Varga et al. | |
| 8,740,088 B2 | 6/2014 | Marguerettaz et al. | |
| 9,070,053 B2 | 6/2015 | Mosteller | |
| 2001/0041214 A1 | 11/2001 | Brogger et al. | |
| 2003/0039765 A1* | 2/2003 | Hayakawa | B23K 26/12 427/554 |
| 2003/0108733 A1 | 6/2003 | Bossert | |
| 2004/0217178 A1 | 11/2004 | Lasch et al. | |
| 2006/0257634 A1 | 11/2006 | Bossert | |
| 2007/0103512 A1 | 5/2007 | Miura et al. | |
| 2009/0309733 A1 | 12/2009 | Moran et al. | |
| 2010/0327060 A1* | 12/2010 | Moran | G07D 7/0043 235/440 |
| 2011/0226858 A1 | 9/2011 | Lasch et al. | |
| 2014/0187322 A1 | 7/2014 | Luchinskiy | |
| 2014/0346150 A1 | 11/2014 | Hesse et al. | |
| 2015/0061650 A1 | 3/2015 | Strietzel | |
| 2016/0042265 A1 | 2/2016 | Rahm et al. | |
| 2016/0114434 A1 | 4/2016 | Regaard | |
| 2016/0193692 A1 | 7/2016 | Regaard et al. | |
| 2016/0201184 A1 | 7/2016 | Seghi et al. | |
| 2017/0080734 A1 | 3/2017 | Wadehn et al. | |
| 2017/0116808 A1 | 4/2017 | Kobrin | |

FOREIGN PATENT DOCUMENTS

| | | | |
|---|---|---|---|
| DE | 2054764 | 6/1971 | |
| DE | 2129926 | 12/1971 | |
| DE | 3407813 | 9/1985 | |
| DE | 4306209 | 9/1994 | |
| DE | 4444233 | 6/1996 | |
| DE | 19650710 | 6/1997 | |
| DE | 19806822 | 8/1999 | |
| DE | 19910880 | 9/2000 | |
| DE | 10027574 | 12/2001 | |
| DE | 10058972 | 5/2002 | |
| DE | 10158403 | 6/2003 | |
| DE | 10248142 | 7/2004 | |
| DE | 10314631 | 10/2004 | |
| DE | 202007018544 | 10/2008 | |
| DE | 102008028776 | 12/2009 | |
| DE | 102008028776 A1 * | 12/2009 | ............ B23K 26/38 |
| DE | 102008033693 | 1/2010 | |
| DE | 102009056584 | 1/2010 | |
| DE | 102010051394 | 5/2012 | |
| DE | 102012102855 | 10/2013 | |
| DE | 102013 2 10078 B4 | 4/2015 | |
| DE | 102013209526 B4 | 4/2015 | |
| DE | 102013218421 A1 | 4/2015 | |
| DE | 202015002913 | 6/2015 | |
| DE | 102014203645 A1 | 9/2015 | |
| DE | 102014210611 | 12/2015 | |
| DE | 102015202732 | 8/2016 | |
| EP | 480489 | 4/1992 | |
| EP | 0850779 | 7/1998 | |
| EP | 1110660 | 6/2001 | |
| EP | 1110660 A2 * | 6/2001 | ............ B41M 5/267 |
| EP | 1223053 | 7/2002 | |
| EP | 1488935 | 12/2004 | |
| EP | 1675040 | 6/2006 | |
| EP | 1758045 | 2/2007 | |
| GB | 1342899 | 1/1974 | |
| GB | 1353063 | 5/1974 | |
| JP | 2002049900 | 2/2002 | |
| JP | 6151401 | 10/2017 | |
| WO | WO 199112589 | 8/1991 | |
| WO | WO 199905636 | 2/1999 | |
| WO | WO 200178042 | 10/2001 | |
| WO | WO 2003045708 | 6/2003 | |
| WO | WO 2004013735 | 2/2004 | |
| WO | WO 2011066816 | 6/2011 | |
| WO | WO 2012037955 A1 | 3/2012 | |
| WO | WO 2016169656 | 10/2016 | |

OTHER PUBLICATIONS

Fofanov et al., "Leaflet 827—Magnetic Properties of Stainless Steel," German Stainless Steel Development Association, 2013, 20 pages.

PCT International Search Report and Written Opinion in International Appln. No. PCT/EP2018/053867, dated Jun. 14, 2018, 18 pages (with English translation).

Play.Google.Com [online], "Metal Detector," [retrieved on Aug. 22, 2019], retrieved from: URL<https://play.google.com/store/apps/details?id=kr.sira.metal>, 4 pages.

RotoView.com [online], "Magnetometer in Smartphones and Tablets," 2015, [retrieved on Feb. 2, 2016], retrieved from: URL <https://www.rotoview.com/magnetometer.htm>, 2 pages.

* cited by examiner ions 35 grated magnetic particles.
ENCODING AND IDENTIFYING A PLATE-LIKE WORKPIECE

CROSS REFERENCE TO RELATED APPLICATIONS

This application is a continuation of and claims priority under 35 U.S.C. § 120 from PCT Application No. PCT/EP2018/053867 filed on Feb. 16, 2018, which claims priority from German Application No. DE 10 2017 202 628.6, filed on Feb. 17, 2017. The entire contents of each of these priority applications are incorporated herein by reference.

TECHNICAL FIELD

This disclosure relates to methods, devices, and systems for encoding a plate-like workpiece in particular a metal sheet, and for identifying a plate-like workpiece.

BACKGROUND

To identify and track products, it has been disclosed to provide the products with a readable code. A method for encoding plate-like workpieces is known, for example, from DE 10 2014 210 611 A1 where a visible code is applied to the workpiece by a laser marking machine. The problem here is that a reworking of these components, e.g., by powder coating, grinding, and deburring, leads to the previously applied laser marking no longer being present or at least being damaged, so that the workpieces can then no longer be tracked or identified.

DE 102 48 142 B3 describes a method for producing a magnetically scannable code in a metallic component by generating permanent microstructural changes by a radiation source. Changing the lattice structure and embedding ions causes a change in the magnetic conductivity in the irradiated areas compared to the non-irradiated areas of the component. However, the method is limited to only a few materials that can be magnetized in this way. In addition, the code thus obtained can only be read out with very complex reading heads.

SUMMARY

Disclosed are methods for encoding and identifying a workpiece using a radiation processing device and encoding systems, making it possible to track workpieces easily regardless of any surface treatments that may be performed later.

The methods include defining an encoding area, applying a magnetic layer to the surface of the workpiece, fusing parts of the magnetic layer to the surface of the workpiece by acting on the workpiece with radiation within the encoding area, cooling the workpiece, and removing the non-fused parts of the magnetic layer.

The magnetic layer includes magnetic particles such as ferromagnetic or paramagnetic particles, and covers the surface of the workpiece at least in the encoding area. The magnetic particles are randomly distributed in the magnetic layer. As a result of the irradiation of the workpiece, the surface of the workpiece is melted in the encoding area. During re-solidification, the magnetic particles of the magnetic layer are absorbed in the molten area and firmly integrated. The incorporation of the magnetic particles into the base material causes a change in the remanence properties of the workpiece. In this way, an encoding of the workpiece can be generated.

The code can be activated by temporarily exposing the encoded workpiece to a magnetic field, so that the magnetic moments are aligned at least in the encoding area. An external magnetic field near the encoding area can be created for this purpose. Due to the different remanence properties of the base material and the melted magnetic particles of the magnetic layer, the fused magnetic layer retains a remanence flux density that is at least a few microteslas larger or smaller than the remanence flux density of the base material of the workpiece after removal of the external magnetic field, e.g., by at least 2-10 microteslas. The code can be read out. This "activation" of the code can also be done later, e.g., after a surface treatment, e.g., a coating or heat treatment.

In some embodiments, the workpiece includes a magnetizable base material. It is particularly advantageous if the base material of the workpiece or the magnetic layer is ferromagnetic or ferrimagnetic, since these materials have magnetic domains. The combination of the random distribution of the magnetic domains of the base material and the magnetic layer, which is different for each workpiece, and the distribution of the magnetic particles within a readable range (read range) results in an individual (unique) coding pattern (magnetic fingerprint) that can be read with simple portable reading devices even if the workpiece is folded or has been subjected to a surface treatment. In the case of paramagnetic materials (e.g., aluminum) or diamagnetic materials, no unique coding pattern is generated due to the lack of magnetic domains, but because of the remanence values or magnetization values of the base material that differ from the corresponding values of the magnetic particles, encoding is still possible using the methods described herein. Depending on whether or how strongly ferromagnetic the material of the workpiece or the magnetic layer is, the magnetic signal is increased or decreased by the integrated magnetic particles.

The magnetic layer can be applied in the form of a film or a paste or sprayed by a nozzle. In some embodiments, for fusing the magnetic layer to the base material, the surface of the workpiece is irradiated with laser radiation. Alternatively, it is also possible to use radiation in the IR or microwave range with an intensity sufficient to melt the surface of the workpiece down through the magnetic layer.

The laser radiation can be focused by a laser optic system through the magnetic layer onto the workpiece surface. The laser optic system can be part of a laser marking machine or laser processing machine. The laser optic system is designed for emitting and focusing laser radiation and can be movable relative to the workpiece. To encode the workpiece, the laser beam is moved over the encoding area (the encoding area is scanned) so that the workpiece is acted on with laser radiation within the area to be marked (encoding area). In this case, a modulated laser beam or a continuous wave laser beam (continuous wave) can be used.

In some embodiments, the laser beam scans the encoding area by a scanning device, e.g., by a galvanometer scanner or MEMS mirror, a flying optic system, or a robot. Galvanometer scanners are highly dynamic rotary actuators with high resolution, good repeatability, and good drift values. Flying optic systems are devices in which the workpiece to be machined is stationary on a workpiece support while the laser optic system moves in three axes, that are used, for example, in 2D laser cutting devices.

Removal of the non-fused parts of the magnetic layer can be accomplished, for example by milling, brushing or scraping.

The magnetic layer can include neodymium, samarium, chromium dioxide, or iron oxide particles.

In certain embodiments, the magnetic layer includes at least one material that acts as a diffusion barrier to the base material of the workpiece, and/or additional method steps are provided to create a diffusion barrier between the melted magnetic layer and the base material of the workpiece. Thus, the code becomes longer lasting and does not lose its recognizability due to mixing of the materials of the melted magnetic layer with the base material of the workpiece. Possible diffusion barriers include a barrier layer with a low diffusion rate. This can be a layer of nickel or a nickel alloy, for example.

In some embodiments, a magnetic layer is used whose remanence flux density differs from the remanence flux density of the workpiece by at least a few microteslas, e.g., 2 to 10 microteslas. When using a ferromagnetic or highly ferromagnetic workpiece (for example made of structural steel) it can be advantageous, for example, to melt magnetic particles that have a lower remanence flux density than the workpiece and thus stand out from the ferromagnetic workpiece due to a reduced magnetic field. When using an only slightly ferromagnetic workpiece, for example, certain stainless steel alloys, it can be advantageous to melt magnetic particles having a higher remanence flux density than the workpiece and thus causing the particles to stand out from the weakly ferromagnetic workpiece due to an increased magnetic field.

In some embodiments, after the removal of the non-fused parts of the magnetic layer, the workpiece is subjected to a surface treatment such as painting, powder coating, grinding, or deburring. The surface treatment thus takes place after the encoding of the workpiece. In the case of a coating, the code is then below the coating and is no longer visible. In this way, the workpiece can be provided with an inconspicuous code. During surface treatment, it should be noted that the encoded workpiece is not demagnetized, and should, for example, not be heated above the Curie temperature.

To simplify the reading of the code, it is advantageous if the workpiece is provided with a marking for positioning a sensor for reading the code. However, it is also possible to select the read-out region so that it extends over the entire workpiece or at least over the entire length or width of the workpiece, or to reproduce the code along the entire length and/or width, so that the code can be read using the sensor independent of the start positioning of the reading device.

In another aspect, the disclosure provides methods for identifying a plate-like workpiece, e.g., a metal sheet, that include encoding the workpiece by a method described herein; storing the code in a memory device; reading the code by measuring the local distribution of the magnetization in a read-out area; and comparing the stored code and the read-out code. When reading the code, magnetic signals (in general magnetic flux densities) are detected from a read-out area including the encoding area, so that the difference of the magnetization inside and outside the encoding area can be detected. The encoding area can include a number of non-contiguous sub-areas ("islands"), between which there are areas without reaction material, so that a more complex code can also be realized. The workpiece can be identified based on the comparison of the stored code and the read-out code. The reading of the code can be carried out at arbitrary points in time or repeatedly, for example to track the workpiece via different machining processes or different dispatch stations.

In some embodiments, the reading of the code of the workpiece takes place by a mobile device, where a Hall sensor measures the magnetic field strength and another sensor, such as an acceleration sensor and/or a gyro sensor, detects the movement of the mobile device relative to the workpiece. The sensors are integrated in the mobile device or combined with the mobile device in a portable reading device. The result of the comparison can be displayed on the mobile device. The read-out code can also be sent to a computer via the Internet for evaluation. In addition, location data can also be determined by a GPS receiver to enable traceability of the workpiece.

In some embodiments, the data for the storage of the code are determined by an initial read-out process (preceding the actual read-out process). For example, this can be done directly after encoding by a stationary or mobile reading device.

In another aspect, the disclosure provides radiation processing devices that include a radiation unit such as a laser processing head for acting on a workpiece with radiation (such as laser radiation) and with a device for removing a magnetic layer applied to the workpiece.

The device for removing the magnetic layer can include a cutting tool, such as a milling tool, a scraping tool, or brushes.

In another aspect, the disclosure further provides encoding systems for encoding and identifying a plate-like workpiece, e.g., by means of the methods described herein. The encoding systems include a coating device for applying a magnetic layer, a radiation processing device described herein for encoding the workpiece by fusing the magnetic layer to the base material of the workpiece in the encoding area, and a reading device for reading the code.

The reading devices described herein can be portable. A "portable reading device" is understood to be a mobile handheld device that is set up to read out magnetic signals, such as, for example, a smartphone, or a tablet computer.

In an advantageous embodiment, the encoding systems include a memory device (e.g., a database) for storing the code (signature data) and a comparing device for comparing codes. A comparing device can be a digital device such as a microcontroller with a program stored on a memory, such as an app, that is configured to compare the data. The workpiece can be identified in this way (especially at a later time and at a location other than the encoding location).

A particularly compact arrangement results if the reading device and/or a second reading device and/or the coating device and/or the device for removing the magnetic layer are integrated in the radiation processing device.

In some embodiments, the radiation processing device is a laser processing machine with a workpiece support and a laser processing head with a laser optic system that can be positioned relative to the workpiece support such that the laser processing machine has a first operating mode for shaping (e.g., for cutting and/or welding) a plate-like workpiece and the laser processing machine has a second mode of operation for encoding the workpiece.

The laser processing machine can be part of a flatbed machine for processing plate-like metallic workpieces. The flatbed machine can be configured to perform further processing steps on the workpiece, such as punching and/or bending and/or drilling and/or threading and/or pre- or post-treating the surface and/or heating or cooling the surface and/or applying the magnetic layer.

It is particularly advantageous if the laser processing machine includes a control device, where the control device is adapted to set the intensity of the laser radiation generated by the laser processing head in the second operating mode so that the magnetic layer is fused with the base material by irradiation of the workpiece in the encoding area with the laser beam. The control device is adapted to reduce the intensity of the laser radiation in the second operating mode with respect to the intensity in the first operating mode, for example by reducing the power and/or by widening the laser beam. In addition, the control device controls the movement of the laser processing head.

The control device is equipped for this purpose with a corresponding computer program product and so this disclosure also relates to a computer program product with a stored program code for an electronic control device suitable for data processing for the encoding systems described, the computer program product containing control commands that cause the control device to carry out the methods described.

The reading device can include a Hall sensor with which the signal strength of the magnetic flux density emanating from the workpiece can be detected.

In addition, the reading device can include an acceleration sensor and/or a gyrosensor and/or a GPS receiver. In this way, the position and orientation of the workpiece relative to the reading device can be determined.

To connect to a database, it is also advantageous if the encoding system has access to the Internet via LAN, Wi-Fi, etc.

Further advantages of the disclosure will become apparent from the description and the drawings. Likewise, the above-mentioned features and those that are to be explained below can each be used individually for themselves or for a plurality of combinations of any kind. The embodiments shown and described are not to be understood as an exhaustive enumeration, but rather have exemplary character for the description.

DETAILED DESCRIPTION

Figure 1:
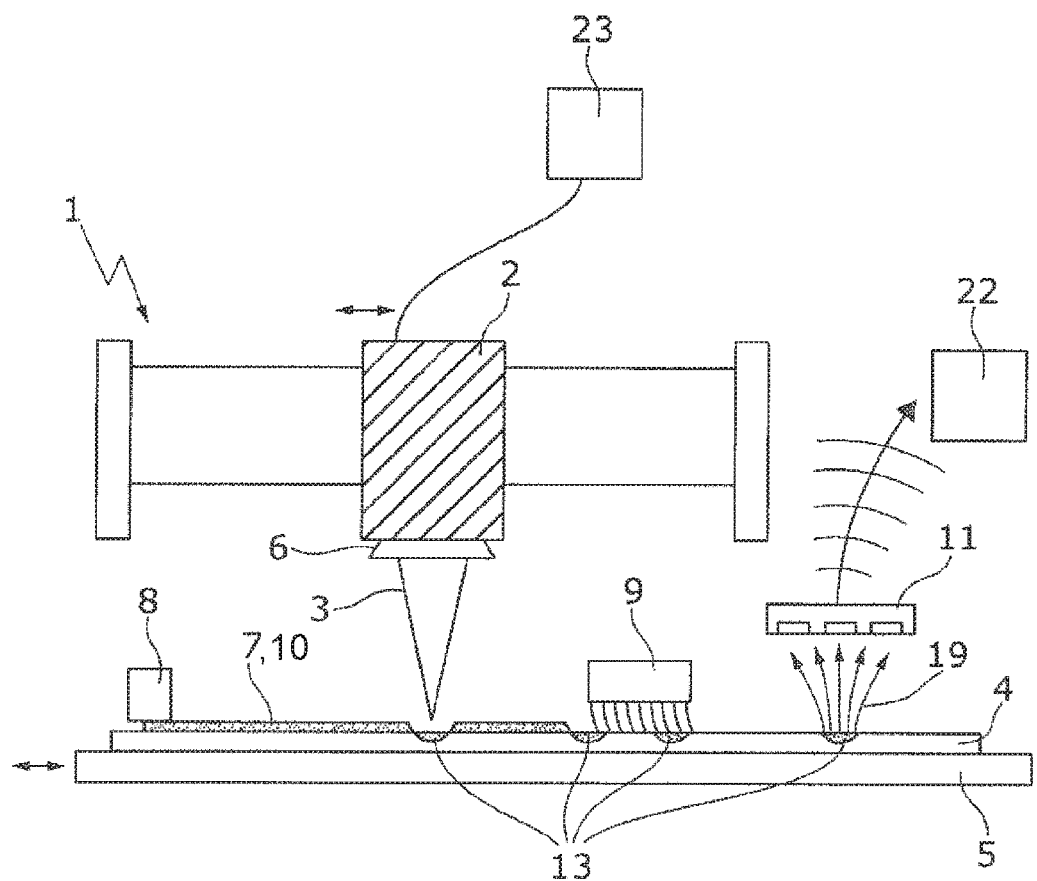
FIG. 1 shows an encoding system with a radiation processing device and a workpiece located being encoded.

FIG. 1 shows an encoding system with a radiation processing device 1. The radiation processing device 1 includes a radiation unit 2 (for example in the form of a laser processing head) with which a workpiece 4 disposed on a workpiece support 5 can be acted on with radiation 3. The radiation unit 2 is designed to scan at least a subarea of the workpiece 4. This can be done by a deflection device (e.g., a MEMS mirror) that detects radiation 3 to different areas of the workpiece 4 or moving the radiation unit 2 and the workpiece holder 5 relative to each other, as indicated in FIG. 1 by the arrows. For focusing the radiation 3, the radiation unit 2 can be equipped with an objective lens 6.

The workpiece 4 includes a base material whose magnetic properties are to be changed by encoding. For this purpose, an encoding area 13 is defined in which magnetic material is to be fused with the base material. The encoding area 13 typically has a size in the microscopic range. The workpiece 4 is first coated with a magnetic layer 7 by a coating device 8, where the coated region includes the encoding area 13. The magnetic layer 7 includes magnetic particles that are fused with the base material by irradiation of the workpiece 4 in the encoding area 13. The wavelength and intensity of the radiation 3 are chosen so that the radiation 3 penetrates the magnetic layer 7 and melts the surface of the workpiece 4 and the magnetic particles of the magnetic layer 7 fuse with the surface of the workpiece 4. The intensity, focus, and beam width of the radiation 3 can be controlled by a control device 23. In certain embodiments, the magnetic layer 7 includes at least one material that acts as a diffusion barrier 10 to the base material of the workpiece 4. This minimizes mixing of the materials of the melted magnetic layer 7 with the base material of the workpiece 4. Possible diffusion barriers include a barrier layer with a low diffusion rate.

After cooling and solidification of the molten material, the parts of the magnetic layer 7 not fused with the base material are removed from the surface of the workpiece 4 by an apparatus 9 for removing the magnetic layer, e.g., by brushing or milling tools.

The material of the magnetic layer 7 and the material of the workpiece 4 are coordinated so that the remanence properties of the two materials differ from each other and the melting of the magnetic particles into the workpiece 4 causes a local change in the remanence of the workpiece 4. This results in a magnetic code. The magnetic field 19 emanating from the workpiece 4 (from the encoding area 13) can be read out by a reading device 11 and stored as signature data in a memory device 22 (database). The area that is read out by the reading device 11 (read-out area) typically has a size in the cm range. The reading device 11 can be permanently integrated in the radiation processing device 1; however, a portable reading device can also be used.

Figure 2:
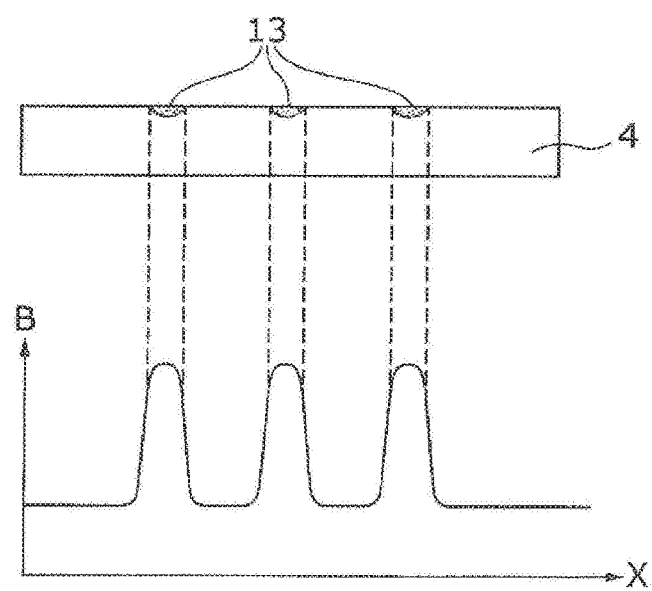
FIG. 2 shows a workpiece encoded by the described methods and an example signal profile determined by a reading device as a function of the position of the reading device for a workpiece made of stainless steel.

FIG. 2 shows the workpiece 1 where magnetic particles are fused in the encoding area 13. Depending on whether or how strongly magnetic is the base material of the workpiece 4, the magnetic signal in the encoding area 13 is increased or decreased by the melting of the magnetic particles. The example magnetic flux density B profile is shown as a function of the position of the reading device 11 for a workpiece made of stainless steel, and the magnetic signal is increased by the encoding. Analogously, the magnetic flux density can be reduced by the encoding, for example for a workpiece made of a highly ferromagnetic structural steel.

Figure 3:
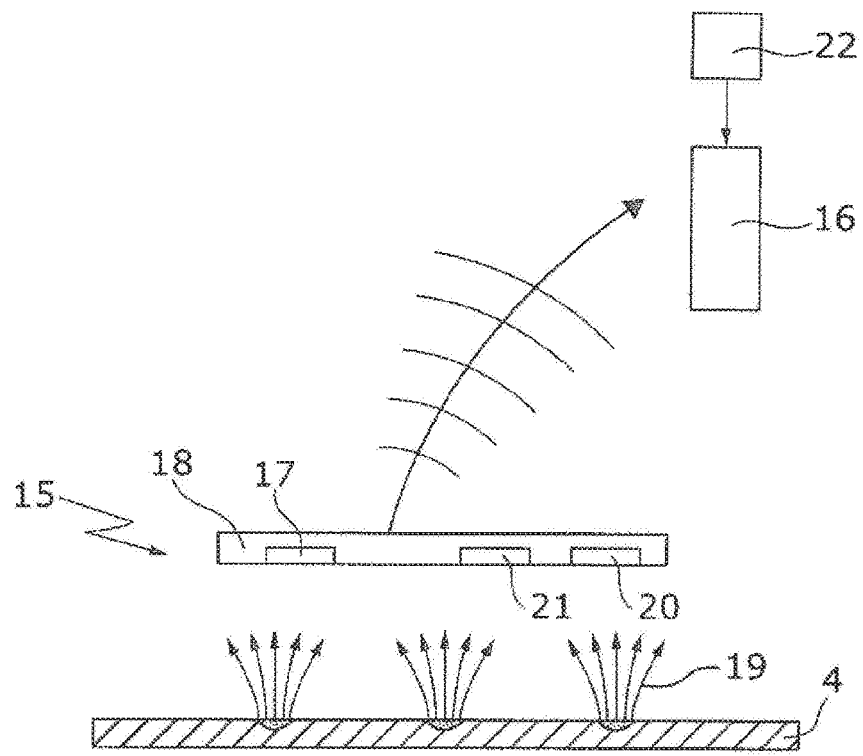
FIG. 3 shows a portable reading device and a comparing and memory device for an encoding system.

If the encoded workpiece 4 is now brought to another workstation, for example, the code can be read there again, for example to identify the workpiece. For this purpose, a portable reading device 15 can be used, as shown in FIG. 3. The code is read out via the reading device 15, for example by Hall sensors 17 that are installed in a mobile device 18, for example a smartphone or a tablet computer. The reading device 15 is moved over the workpiece 4 at a distance of a few cm away to read out the code. The mobile device 18 is brought to the correct position on or above the workpiece 4, and it is helpful for this purpose if a mark is made on the workpiece 4 or a rule is established as to where the code is to be attached (e.g., "always lower left corner"). If the portable reading device 15 is guided with the Hall sensors 17 over the workpiece 4, the movement can be detected via a movement sensor 21 (gyrosensor and/or acceleration sensor) so that the signal can be indicated as a function of the location (here along the direction x for example). If the portable reading device 15 has a GPS receiver 20, the location of the workpiece 4 can also be determined when reading the fingerprint and transmitted via the Internet, for example to a product vendor. Using a comparing device 16 (for example, in the form of an app that is connected to a database via the Internet), this unique fingerprint can be checked for authenticity. The data of the sensors 17, 20, 21 are transmitted to the comparing device 16, e.g., via W-LAN, and compared there with the signature data stored in the memory device 22. In this way, the workpiece 4 can be identified and the properties of the workpiece 4 that are stored in the memory device 22 can be verified.

The magnetic code can be painted over or powder-coated without affecting its readability.

LIST OF REFERENCE SIGNS

1 Radiation processing device
2 Radiation unit (a laser processing head with laser optic system)
3 Radiation, (laser beam)
4 Workpiece
5 Workpiece support
6 Objective lens
7 Magnetic layer
8 Coating device
9 Device for removing the magnetic layer
11 Reading device for reading out the code after the encoding process
13 Encoding area
15 Portable reading device
16 Comparing device
17 Hall sensors
18 Mobile device
19 Magnetic field/field lines emanating from the encoding area
20 GPS receiver
21 Additional sensors (gyrosensor/acceleration sensor)
22 Memory device/database
23 Control device

OTHER EMBODIMENTS

A number of embodiments have been described. Nevertheless, it will be understood that various modifications can be made without departing from the spirit and scope of the disclosure. Accordingly, other embodiments are within the scope of the following claims.

What is claimed is:

1. A method for encoding a plate-like workpiece, the method comprising:
   defining an encoding area on the workpiece;
   applying a magnetic layer to a surface of a base material of the workpiece;
   fusing parts of the magnetic layer with the base material of the workpiece by acting on the workpiece with radiation to melt the magnetic layer and the base material within the encoding area to form a molten area with a recognizable pattern;
   cooling the workpiece to re-solidify the molten area, wherein during re-solidification, magnetic particles of the magnetic layer are incorporated into, and firmly integrated in, the re-solidified previously molten area of the workpiece to cause a change in a remanence property of the workpiece to generate an encoding in the encoding area; and
   removing non-fused parts of the magnetic layer.

2. The method of claim 1, wherein the magnetic layer is applied as a film or a paste or is sprayed by a nozzle.

3. The method of claim 1, wherein fusing the magnetic layer comprises irradiating the surface of the workpiece with laser radiation.

4. The method of claim 3, further comprising focusing the laser radiation by a laser optic system through the magnetic layer onto the workpiece surface.

5. The method of claim 1, wherein the magnetic layer has a remanence flux density that differs from a remanence flux density of the workpiece by at least 2-10 microteslas.

6. The method of claim 1, further comprising, after removal of the magnetic layer, subjecting the workpiece to a surface treatment including one or more of painting, powder coating, grinding, or deburring.

7. A method for identifying plate-like workpieces comprising:
   receiving a workpiece encoded with a code by a method for encoding a plate-like workpiece, the method for encoding comprising:
      defining an encoding area on the workpiece,
      applying a magnetic layer to a surface of a base material of the workpiece,
      fusing parts of the magnetic layer with the base material of the workpiece by acting on the workpiece with radiation to melt the magnetic layer and the base material within the encoding area to form a molten area with a recognizable pattern,
      cooling the workpiece to re-solidify the molten area, wherein during re-solidification, magnetic particles of the magnetic layer are incorporated into, and firmly integrated in, the re-solidified previously molten area of the workpiece to cause a change in a remanence property of the workpiece to generate an encoding in the encoding area, and
      removing non-fused parts of the magnetic layer;
   storing the code in a memory device;
   reading the code by measuring a local distribution of magnetization in a read-out area; and
   comparing the stored code and the read-out code.

8. The method of claim 7, wherein the code of the workpiece is read out by a mobile device, and further comprising detecting movement of the mobile device relative to the workpiece by a movement sensor and measuring a magnetic field strength by a Hall sensor.

9. The method of claim 8, wherein the movement sensor is at least one of an acceleration sensor and a gyro sensor.

10. A radiation processing device comprising:
    a radiation unit for acting on a workpiece with radiation for melting and fusing magnetic particles of a magnetic layer to a surface of a base material of a workpiece in an encoding area; and
    a device for removing irradiated and melted, but non-fused, parts of the magnetic layer applied to the base material of the workpiece, wherein during re-solidification, magnetic particles of the magnetic layer are incorporated into, and firmly integrated in, the irradiated encoding area of the base material of the workpiece; and
    a control device that controls the device to carry out the method of encoding of claim 1.

11. The radiation processing device of claim 10, wherein the radiation is laser radiation.

12. The radiation processing device of claim 10, wherein the device for removing the magnetic layer comprises a cutting tool, a milling tool, a scraping tool, or brushes.

13. An encoding system for encoding and identifying a plate-like workpiece, comprising:
    a coating device for applying a magnetic layer; and
    the radiation processing device of claim 10, configured for encoding the workpiece with a code by fusing the magnetic layer to the base material of the workpiece in the encoding area.

14. The encoding system of claim 13, further comprising a memory device for storing the code and a comparing device for comparing codes.

15. The encoding system of claim 13, wherein at least one of the reading device, a second reading device, the coating device for applying the magnetic layer, and the device for removing the magnetic layer are integrated in the radiation processing device.

16. The encoding system of claim 13, wherein the radiation processing device is a laser processing machine having a workpiece support and a laser processing head with a laser optic system,
   wherein the processing head can be positioned relative to the workpiece support;
   wherein the laser processing machine has a first operating mode for shaping a plate-like workpiece; and
   wherein the laser processing machine has a second operating mode for encoding the workpiece.

17. The encoding system of claim 16, wherein shaping the plate-like workpiece comprises one or both of cutting and welding the plate-like workpiece.

18. The encoding system of claim 13, further comprising a reading device for reading the code.

19. The encoding system of claim 18, wherein the reading device is a portable reading device.

* * * * *